(12) United States Patent
Seely (10) Patent No.: US 7,669,201 B2
(45) Date of Patent: Feb. 23, 2010

(54) SYSTEM AND METHOD FOR COMMON FILE INSTALLATION

(75) Inventor: James Edward Seely, Cedar Rapids, IA (US)

(73) Assignee: Intermec IP Corp., Woodland Hills, CA (US)

( * ) Notice: Subject to any disclaimer, the term of this patent is extended or adjusted under 35 U.S.C. 154(b) by 651 days.

(21) Appl. No.: 11/120,328

(22) Filed: May 2, 2005

(65) Prior Publication Data

US 2006/0248524 A1   Nov. 2, 2006

(51) Int. Cl.
*G06F 9/445* (2006.01)
(52) U.S. Cl. .................. 717/178; 717/146; 717/148
(58) Field of Classification Search .......... 717/146, 717/148, 178
See application file for complete search history.

(56) References Cited

U.S. PATENT DOCUMENTS

| | | | | |
|---|---|---|---|---|
| 5,276,881 A | * | 1/1994 | Chan et al. | 717/147 |
| 5,604,905 A | * | 2/1997 | Tevanian et al. | 717/140 |
| 6,067,622 A | * | 5/2000 | Moore | 726/31 |
| 6,170,083 B1 | * | 1/2001 | Adl-Tabatabai | 717/158 |
| 6,370,682 B1 | * | 4/2002 | Eckardt et al. | 717/141 |
| 6,381,742 B2 | * | 4/2002 | Forbes et al. | 717/176 |
| 6,738,967 B1 | * | 5/2004 | Radigan | 717/146 |
| 6,996,814 B2 | * | 2/2006 | Bak | 717/148 |
| 7,080,159 B2 | * | 7/2006 | Chu et al. | 709/246 |
| 7,328,436 B2 | * | 2/2008 | Perez | 717/178 |

OTHER PUBLICATIONS

Broustaut et al. "Verification of ANDF components" ACM, 1995, pp. 103-110.*
Cramer et al. "Compiling Java Just in Time" IEEE Micro, 1997, pp. 36-43.*

* cited by examiner

*Primary Examiner*—Wei Y Zhen
*Assistant Examiner*—Phillip H Nguyen
(74) *Attorney, Agent, or Firm*—O'Melveny & Myers LLP (57) ABSTRACT

The invention provides a method and system for creating a single, common installation file for multiple target device types. In one approach, the method comprises providing a base engine, compiling the engine into an intermediate language code, and just-in-time compiling the intermediate code into executable code. The latter code is executed to gather the appropriate data sets and concatenate the data sets with the engine to form the installation file. The present invention also provides a method and system for utilizing the installation file to retrieve the appropriate data set(s) for the identified target device type, and to install the retrieved data set(s) onto the target device.

9 Claims, 6 Drawing Sheets

FIG. 6C ial digital
SYSTEM AND METHOD FOR COMMON FILE INSTALLATION

BACKGROUND OF THE INVENTION

1. Field of the Invention

The present invention relates to software installation and, more particularly, a system and method for creating and deploying a single common software file that can be used to install the appropriate data sets on multiple devices having different processors or operating systems.

2. Description of Related Art

Different electronic devices (e.g., desktop computers, laptop computers, pocket personal computers, personal digital assistants, handheld computers, cell phones, etc.) can have different hardware and software components with unique specifications and settings. For example, electronic devices can comprise numerous different operating systems and processor types. A device having a unique operating system-processor combination typically needs a unique installation file in order to be able to install the proper files onto it. The need for device-specific installation files largely results from using native programming languages that require executables and supporting code files to be compiled for a specific processor type. Sometimes, the device-specific installation files contain code for the specific operating system. Currently, installing a set of files to devices with different processors and/or operating systems requires a different type of software file for each unique processor-operating system combination.

Figure 1:
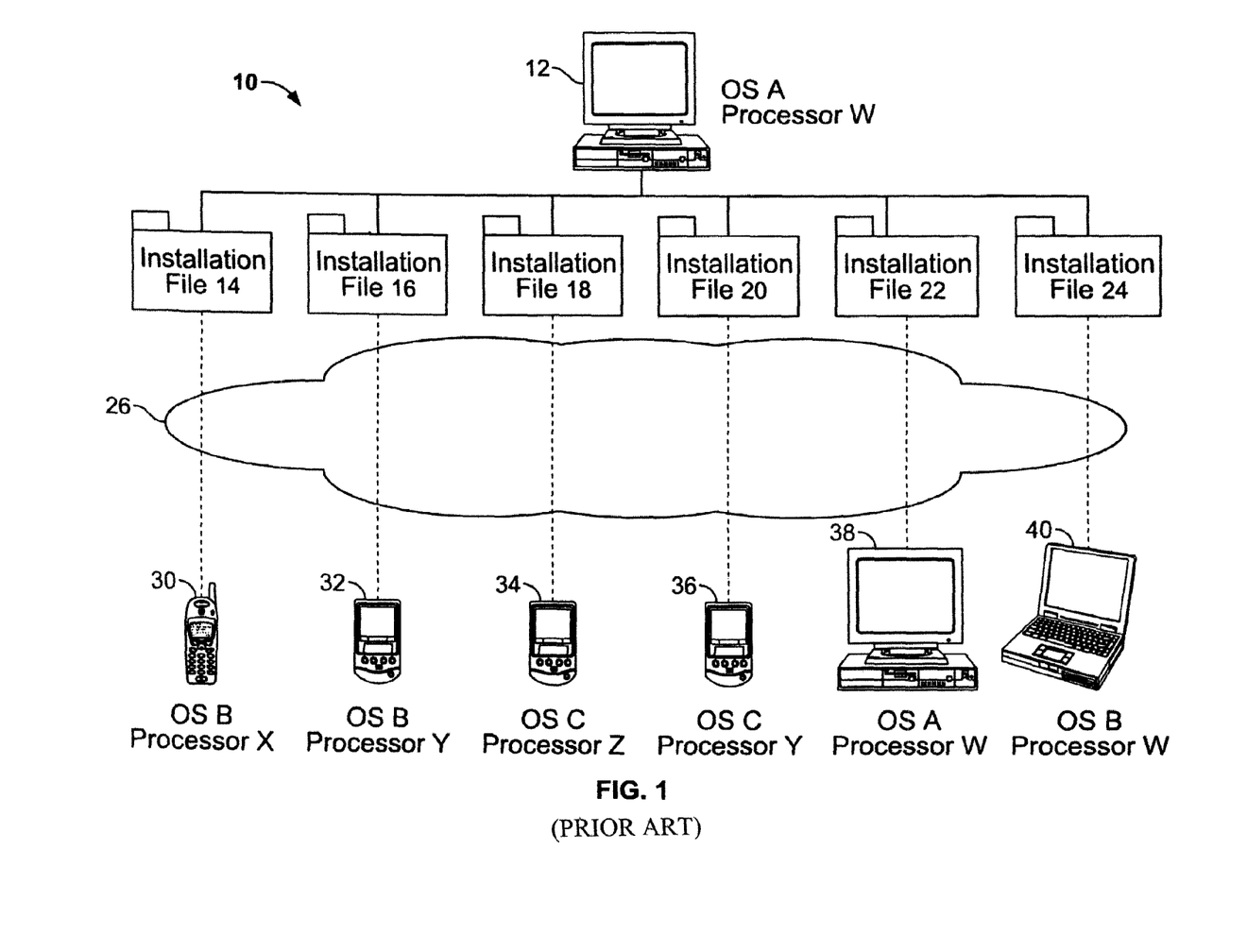
FIG. 1 is a system diagram illustrating a prior art software installation system that comprises different installation files that are deployed to the various different devices.

Examples of existing programs that perform installation functions include Wise Windows Installer, Wise for Visual Studio .NET, InstallShield's installation utility, Microsoft's CabWiz, and Microsoft's Setup and Deployment Wizard in Visual Studio .NET 2003. None of these products comprise a single common file that can be deployed on multiple platforms; rather, these products create and/or utilize numerous different installation packages for different processor/operating system combinations. FIG. 1 depicts a typical current software installation system 10 that comprises a development platform or computer 12, a plurality of installation files (e.g., files 14, 16, 18, 20, 22, and 24), a file deployment subsystem 26, and a plurality of target devices (e.g., devices 30, 32, 34, 36, 38, and 40).

With continued reference to FIG. 1, the development platform 12 comprises a computer with processor W and operating system A. Each of the target devices comprises an operating system from a group consisting of A, B, and C, and a processor type from a group consisting of W, X, Y, and Z. Device 30 is a cell phone with operating system B and processor X. Device 32 is a personal digital assistant (PDA) that has processor Y and operating system B. Device 34 is a PDA with operating system C and processor Z. Device 36 is a PDA with operating system C and processor Y. Device 38 is a desktop computer with operating system A and processor W. Device 40 is a laptop computer with operating system B and processor W.

There is a different installation file for each of the devices. Specifically, installation file 14 is specific to a cell phone having processor X and operating system B. Similarly, installation files 16, 18, 20, 22, and 24 are geared toward devices 32, 34, 36, 38, and 40, respectively. File transportation system 26 comprises a medium, network, or the like, that facilitates the deployment of files 14, 16, 18, 20, 22, and 24 to devices 30, 32, 34, 36, 38, and 40, respectively. For example, deployment subsystem 26 can comprise CDs, downloadable files, network connections, or the like, or combinations thereof.

A typical current software installation method comprises the steps of running a program on a development computer 12 to create a unique installation file for each processor and operating system combination, deploying the installation files to the appropriate target devices, and copying and running each unique install file on the respective target device to perform the installation.

For a customer that uses various different types of devices, each with different operating systems and/or processor types, it is inconvenient, time-consuming, and perhaps confusing if he/she has to install multiple versions of a given type of software onto his/her devices. For example, with reference to FIG. 1, a consumer may own three different types of personal computers (PCs)—namely, a pocket PC 36, a desktop PC 38, and a laptop PC 40—wherein each PC has a unique processor-operating system combination. As a result, the consumer would have to download and install three different versions or types of an installation software (e.g., a new program, patch, virus definition list, or the like).

What is desired is a system and method for installing software or data onto target devices with a single, common installation file, which expedites the process of loading the software/data onto multiple devices, and thereby saves customers time spent on figuring out which installation file(s) is needed to install software/data to a specific type of device.

SUMMARY OF THE INVENTION

The present invention provides a system and method for installing data files or digital information on multiple types of target devices using a common installation file. While software programs that perform installation functions have been adapted for different types of electronic device platforms, they have not heretofore been designed as a single common file that can be deployed to and compiled on multiple platforms.

In accordance with one aspect of the embodiments described herein, there is provided a method of installing data onto a target device. In one approach, the method comprises providing an installation file, the installation file comprising an engine and plural data sets corresponding respectively to plural target device types, the engine being in an intermediate language code. The method further comprises loading the installation file onto the target device and just-in-time compiling the engine into code executable on the target device type. The compiled engine is executed to identify the target device as one of the plural target device types, to retrieve the corresponding one of the plural data sets for the identified target device type, and to install the retrieved data set onto the target device.

In accordance with another aspect of the embodiments described herein, there is provided a method of creating an installation file. In one approach, the method comprises providing a base engine written in source code and compiling the engine into an intermediate language code. The method further comprises just-in-time compiling the intermediate language code of the engine into executable code. The compiled code is executed to gather plural data sets corresponding respectively to plural target device types and concatenate the intermediate language code of the engine with the gathered data sets to form the installation file.

In accordance with yet another aspect of the embodiments described herein, there is provided a computer program product that comprises an engine and plural data sets corresponding respectively to plural target device types. In one embodiment, the engine of the product comprises computer executable instructions to be just-in-time compiled into code executable on a target device. The target device executable code preferably comprises instructions for retrieving the corresponding one of the plural data sets for the identified target device type, and installing the retrieved plural data set onto the target device.

A more complete understanding of the software installation system and method described herein will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

The present invention satisfies the need for a file installation system and method that involves creating, deploying, and using a single software file to install the appropriate files on different types of devices. In the detailed description that follows, like element numerals are used to describe like elements illustrated in one or more of the figures.

In accordance with one aspect of the embodiments described herein, there is provided a file installation system that comprises a development computer for creating an installation file, and a subsystem for deploying the installation file from the development computer to a plurality of target devices. Each target device typically receives and runs the installation file to extract the appropriate file set(s) from the installation file based on the specifications of the target device (e.g., operating system, processor type, etc.), wherein the file set(s) comprises data to be installed on the target device.

Figure 2:
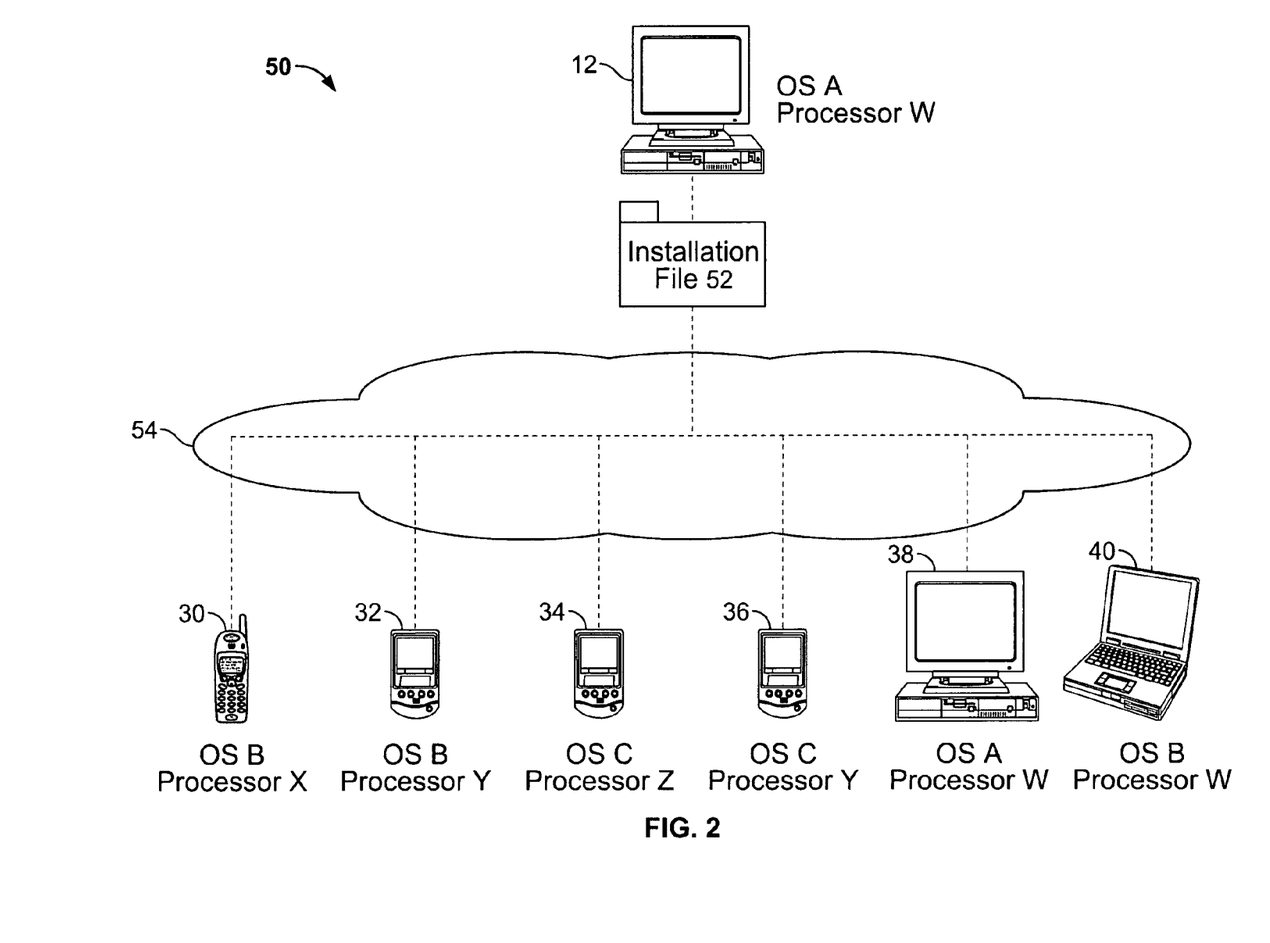
FIG. 2 is a system diagram illustrating an embodiment of a software installation system that utilizes a single common installation file that is deployed to the various different types of devices.

In one exemplary embodiment, illustrated in FIG. 2, the installation file system 50 generally comprises a development computer 12 used to create an installation file 52, and a file deployment subsystem 54 for deploying the installation file 52 to a plurality of target devices (e.g., devices 30, 32, 34, 36, 38, and 40). As with system 10 in FIG. 1, system 50 comprises a plurality of target devices wherein each of the devices has an operating system from a group consisting of A, B, and C, and a processor from a group consisting of W, X, Y, and Z. In contrast to system 10 of FIG. 1, however, system 50 does not require a different installation file for each of the devices; rather, system 50 comprises a single common installation file 52 that is compatible with target devices 30, 32, 34, 36, 38, and 40. In one embodiment, the installation file 52 comprises a concatenated package of file sets wherein a subset of the file sets are extracted and installed on any given target device, as explained in further detail below. In another embodiment, the installation file 52 comprises a concatenated package of data sets in lieu of file sets.

The file deployment subsystem 54 comprises any suitable medium, network, or the like that facilitates the deployment of installation file 52 onto devices 30, 32, 34, 36, 38, and 40. For example, in one embodiment, subsystem 54 comprises a personal computer, an internet connection, a modem for interfacing the PC with the internet, and a cradle or connector for connecting the target device (e.g., a personal digital assistant, cell phone, etc.) with the PC. An installation file 52 can be downloaded from the internet onto the PC and then transferred to one or more connected target devices. In another embodiment, the subsystem 54 comprises a PC, a storage medium (e.g., a compact disc) that contains the installation file 52, and a connector for the target device. The installation file 52 can be saved to the PC, which in turn transfers the installation file 52 to one or more target devices. In another embodiment, where the target device is a desktop computer 38 or laptop computer 40, the subsystem 54 comprises an internet connection and a modem for interfacing the target device with the internet, so that the installation file 52 can be downloaded directly onto the target device (e.g., computer 38 or 40).

The exemplary development platform or computer 12 shown in FIG. 2 is not meant to indicate that only one type of machine can be used to create the installation file 52. Also, the types of target devices (e.g., devices 30 and 38) shown in FIG. 2 are only a small subset of the computing and electronics devices that can receive and utilize an installation file 52 received over deployment subsystem 54. It will be understood that the file installation method and system disclosed herein can be used to install any type of file on any target computing device with memory, and is not limited to traditional computing devices or specific types of files.

Figure 3:
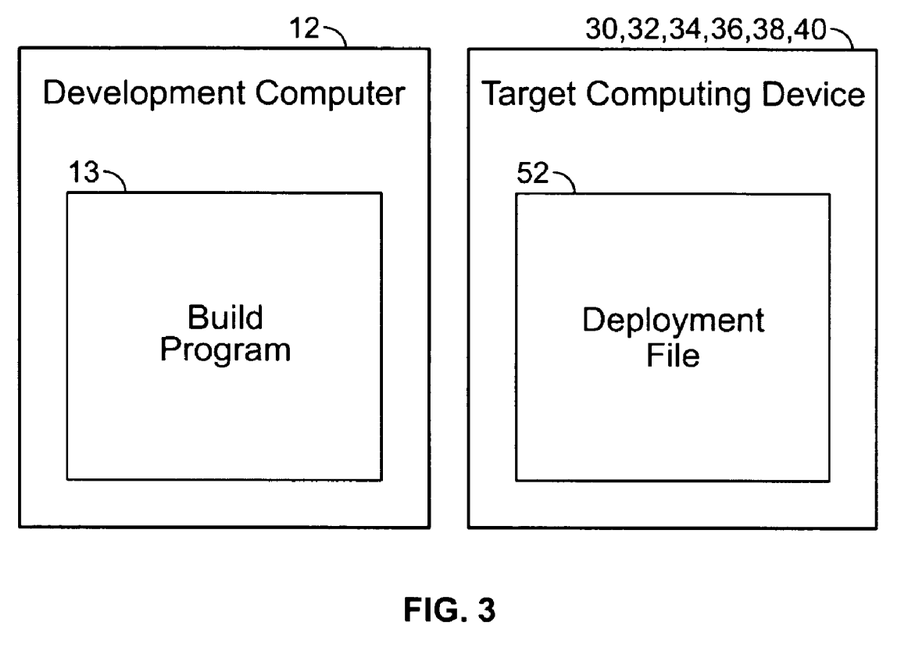
FIG. 3 is a block diagram showing the relationship between the software used to build the installation file and the installation file that is deployed to the target computing devices.
Figure 5:
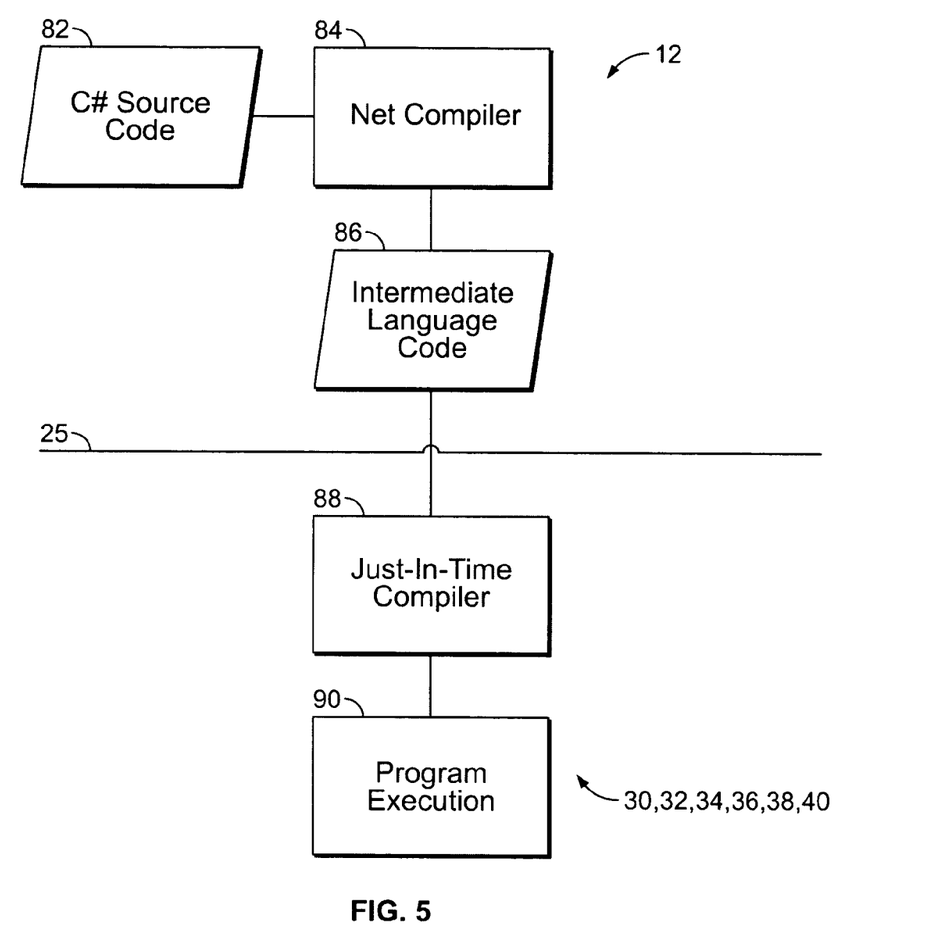
FIG. 5 is a block diagram showing the relationship between the source code of the installation file and the code that is executed by the target device.

In accordance with another aspect of the embodiments described herein, there is provided a method of creating an installation file. With reference to FIG. 3, the installation file is typically created on a development computer 12 by running a installation file development program 13, which comprises a base engine written in source code. For example, the base engine can be programmed in C# on the development computer 12. Alternatively, the engine can be programmed in Visual Basic .NET or another similar programming language. The base engine is compiled into an intermediate language code on the development computer 12. For example, a stage compiler (e.g., Java compiler, .NET compiler, or the like) can be used to compile the base engine from source code to an agnostic, intermediate language code, which can be just-in-time compiled on the development computer 12, as shown in FIG. 5. When the intermediate language code of the engine is just-in-time compiled into code executable on the development computer 12, the computer 12 executes the compiled code to create the installation file. The specifics of how the executed code generates the installation file is explained in further detail below.

Figure 6A:
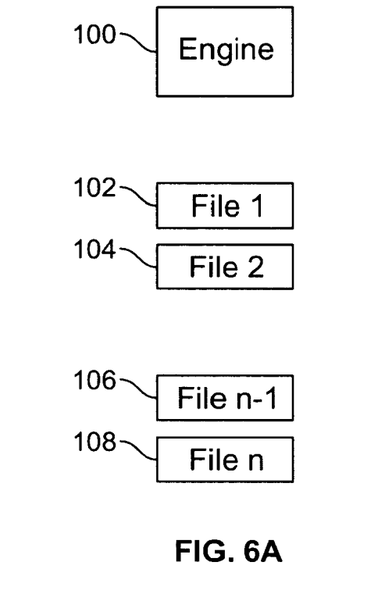
FIG. 6A is a block diagram showing a base engine and plural data files that exist as separate files before the installation file is created.

The installation file preferably comprises the engine, which is in intermediate language code, and one or more data sets that are to be installed on one or more target devices. FIG. 6A illustrates a base engine 100 and data files 1 through n (e.g., 102, 104, 106, and 108) as separate files before the engine the installation file 52 is created. The engine 100 is in intermediate language code if it has been compiled by a compiler, such as a .NET compiler, on the development platform 12; otherwise, the engine 100 remains in source code.

Figure 6B:
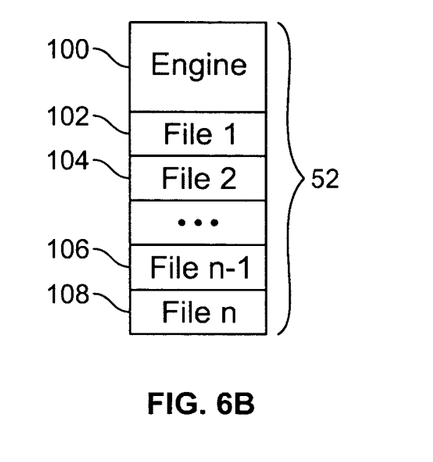
FIG. 6B is a block diagram showing the base engine and plural data files of FIG. 6A concatenated into a single installation file.
Figure 6C:
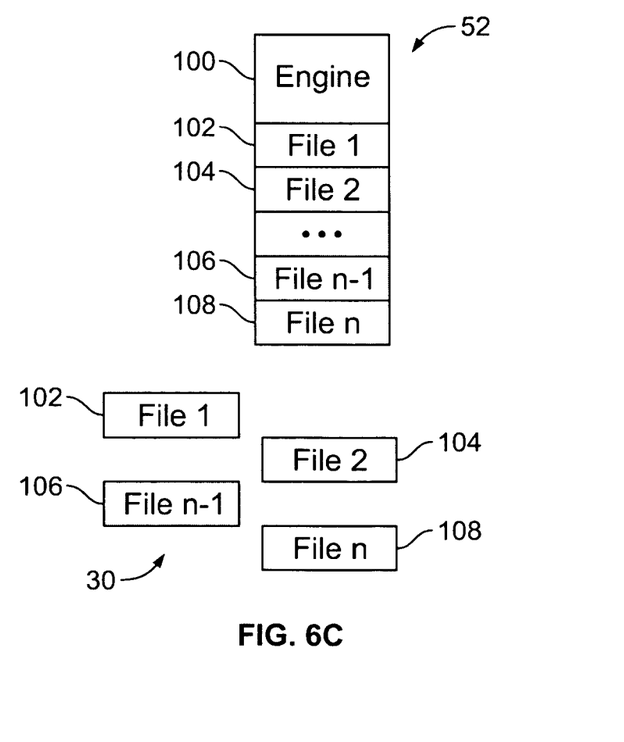
FIG. 6C is a block diagram showing the engine portion of the installation file in FIG. 6B being just-in-time compiled on the target device, allowing the data files to be extracted onto the target device.

FIG. 6B shows the installation file 52 that results when the engine 100 in intermediate language code is just-in-time compiled into machine executable code. In a preferred approach, the engine 100 is just-in-time compiled on the development platform 12 into code that is executable by the development platform. The development platform executes the compiled code to gather plural files (e.g., files 1 through n) corresponding respectively to plural target device types and concatenate the engine 100 with the gathered files 1 through n, thereby generating installation file 52. In an alternative approach, the engine 100 is just-in-time compiled on a machine other than the development platform 12. Still, the machine executes the compiled engine code to create the installation file 52 by gathering data files 1 through n and concatenating these files with the engine 100. The engine 100 and data files 1 through n are concatenated to form a single, common installation file 52 that can be used to install the appropriate data (e.g., 102, 104, 106, and 108) on the target device (e.g., device 30), as illustrated in FIG. 6C. The installation of the data files on the target device(s) is explained in further detail below.

With reference to FIGS. 3 and 6B, once the just-in-time compiled engine code is executed on the development computer 12, the computer 12 gathers the plural data sets corresponding respectively to the plural target device types (e.g., devices 30, 32, 34, 36, 38, and 40) and concatenates the intermediate language code of the engine with the gathered data sets to form the installation file. In an alternative approach, the computer 12 gathers plural file sets corresponding respectively to the plural target device types and concatenates the intermediate language code of the engine with the gathered file sets to form the installation file 52.

The computer 12 can gather the plural data/file sets in any number of ways. In one approach, the computer 12 queries the user for information regarding the target device(s) during the installation file creation process, as shown in step 68 of FIG. 4. For example, in one approach, the program 13 on computer 12 queries the user for the list of target devices, types of processors and operating systems are on the target devices, etc. in order to build an installation file that is compatible with each of the target devices. Other factors that can be considered when building the installation file include: which data/files are needed to go into the installation file, where to extract the data/files to when they are installed; the dynamic root entry, and any other information that facilitates dynamically installing the data/files onto the target devices. Because different devices can have different directory structures, the dynamic root information allows for the appropriate data/files to be extracted to appropriate paths based on the type of target device on which installation is being performed. The user entered data can also include information relating to what to call the new installation file and the coding format of the installation file.

Alternatively, the program 13 obtains information regarding the target device(s) from another file on the computer 12, the system settings, and/or registry. For example, in one scenario where one or more of the target devices are or have been connected to the computer 12, the program 13 checks the registry to determine the types of devices that have been connected to computer 12, whether or not programs such as ActiveSync or the like are available. In a preferred approach, the program 13 accesses another file on the computer 12 that has a list of the data files that need to be installed onto the target devices. Certain of the methods described herein are refer to the gathering and installation of data files to target devices. It will be understood, however, that the same or similar methods can be used to install data (not in file form) on the target devices, either in lieu of or in conjunction with data files. In one approach (not illustrated), one or more of the data files to be installed on the target devices are encrypted and/or compressed.

The methods and embodiments explained herein describe the an installation file that comprises the base engine in intermediate language code and plural data sets for the plural target device types. It will be understood, however, that in another approach, the plural data sets are concatenated with a separate set of instructions in intermediate language code, either in lieu of or in conjunction with the base engine. For example, instead of attaching the plural data sets to the same engine that was used to query information from the developer, data sets are attached to another smaller engine capable of extracting the data sets from the installation file, thereby resulting in a smaller installation file. In another approach, part of the dynamic information obtained from the user is used to determine which subset of files to extract from the installation file 52. With the ubiquity of .NET, (an application development platform), Java, and other platform agnostic development environments and with the promise of portable code, one skilled in the art will recognize that there are numerous approaches to designing file installation systems and components that allow the same file to be installed on different types of devices that can have different operating systems and/or types of processors.

In accordance with yet another aspect of the embodiments described herein, there is provided a method of installing data onto a target device. In a preferred approach, the method involves deploying a single common installation file that is run on all target devices, thereby eliminating the need to create and deploy multiple installation files for multiple devices. The method generally comprises deploying an installation file to one or more target devices, and extracting the appropriate files from the installation file onto the target devices. In an exemplary approach, the method further comprises the step of collecting information from a user to build the installation/deployment file.

For example, with reference to FIGS. 2 and 3, in one approach to installing files to multiple target devices with a single installation file comprises the steps of: (1) running a program 13 on a development platform 12 to create an installation file 52; (2) deploying the installation file 52 to one or more targeted devices; and (3) running the installation file 52 on each target device (e.g., devices 30, 32, 34, 36, 38, and 40). The installation file 52 is deployed to the target devices via any suitable file transfer medium. For example, the step of deploying the installation file can comprise placing the installation file 52 on a remote file system that is accessible by the plural target device types, so that the installation file can be downloaded onto the target device types. In one approach, the installation file is uploaded to an internal network system. In another approach, the installation file is uploaded to an internet site. Alternatively, the step of deploying or providing the installation file can comprise saving the installation file onto a storage medium (e.g., a compact disc) and distributing the storage medium to users of the plural target device types, so that the users can load the installation file onto the their respective target devices.

In a preferred approach, the method of installing data onto a target device comprises providing an installation file that comprises an engine and plural data sets corresponding respectively to plural target device types. As explained above, the engine is in an intermediate language code. The method further comprises loading the installation file onto the target device and just-in-time compiling the engine into code executable on the target device type. Next, target device executable code is executed by the target device to retrieve the corresponding one of the plural data sets for the identified target device type. The retrieved data set is then installed on the target device.

Figure 4:
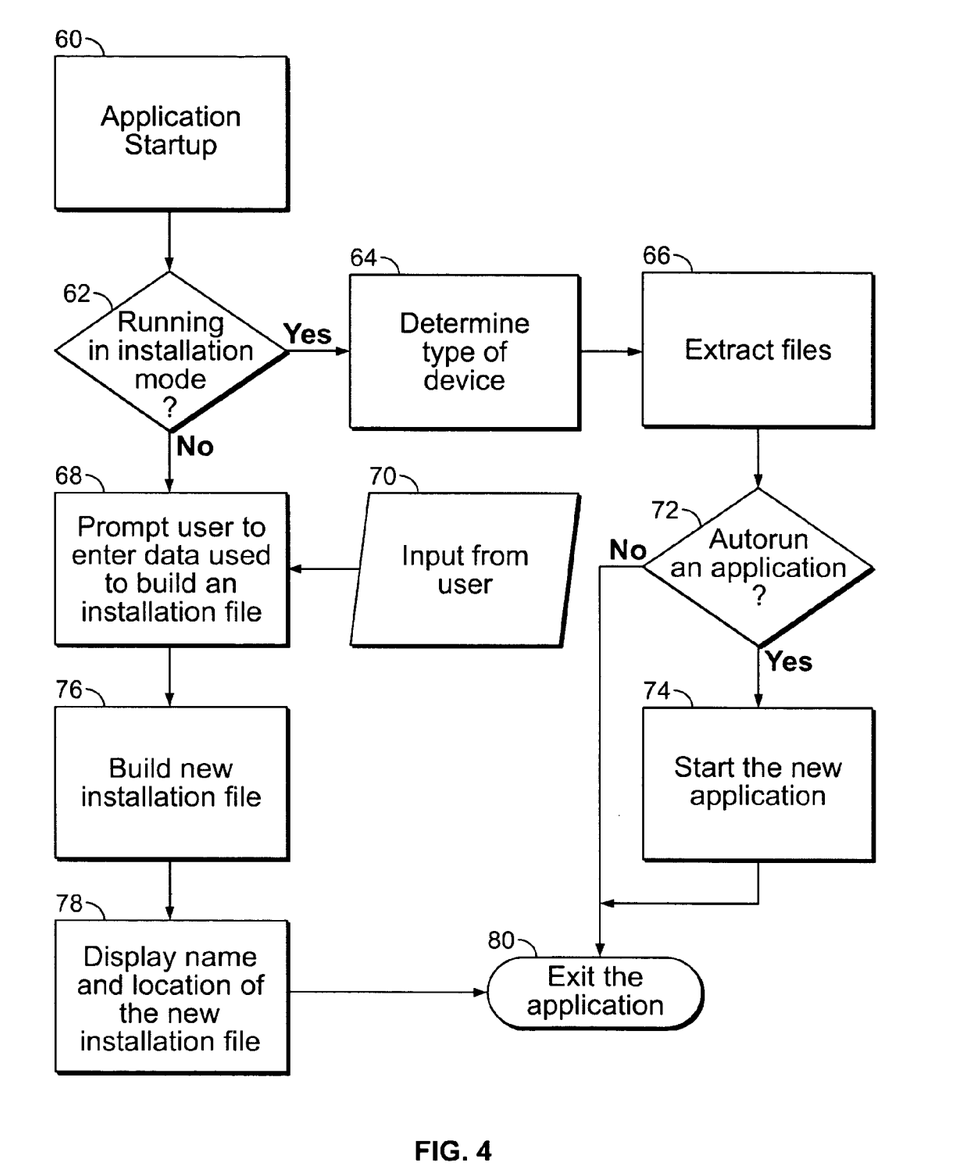
FIG. 4 is a flowchart illustrating a method of creating and deploying a single common installation file to one or more target devices types in accordance with an embodiment of the present invention.

With reference to FIG. 4, there is provided a flowchart that outlines an exemplary process for creating and deploying a single installation file to one or more target devices. At the startup (Step 60), the file installation application (e.g., software 13 on development computer 12 as depicted in FIG. 3), determines whether or not an installation file 52 has already been created (Step 62). More specifically, initially the file installation application comprises a base engine that is in intermediate language code and executable by any device that has a just-in-time compiler. The base engine looks at the end of its file to determine if there is any information (i.e., file sets or data sets) stored at the end of the executable. If there are data or file sets attached to the end of the executable (i.e., an installation file 52 has already been created), the application proceeds to Step 64; otherwise, the application proceeds to Step 68 to attached data/file sets to the base engine.

In one approach, if an installation file 52 has not been created, the application prompts the user to enter data used to build the installation file 52 at Step 68. In another approach (not illustrated), the data used to build the installation file is obtained from a registry on the development platform. Data used to build the installation file 52 can include information, such as, for example: which files are needed to go into the installation file; where to extract the files to when they are installed; the dynamic root entry; and other information that will help to dynamically install the files on a given device. Because different devices can have different directory structures, the dynamic root information allows for the same file to be extracted to different paths based on the type of device on which installation is being performed. The user entered data can also include information relating to what to call the new installation file and the coding format of the installation file, explained in further detail below.

Once the application collects the input information from the user (Step 70), the application proceeds to build an installation file 52 that comprises all of the required files and information needed to perform extraction and installation at the target device(s) (Step 76). In one approach, the installation file 52 comprises a copy of the program 13 used to collect the information from the developer with all of the pertinent files and extraction information attached to it. In one approach, the name and location of the installation file 52 is preferably displayed on the development computer 12 (Step 78). After the installation file 52 is created and information regarding the installation file 52 is displayed, the final step comprises exiting the application (Step 80).

With reference to Step 62 in FIG. 4, once an installation file 52 has been created (i.e., data plural data sets corresponding respectively to plural target device types are attached to the base engine), the application initiates installation mode. In a preferred approach, installation mode is initiated immediately after creation of the installation file. Installation mode typically comprises deploying the installation file 52 to one or more target devices. In one approach, the installation file 52 is automatically transferred to the target device(s) to remotely initiate the installation process.

Once the installation file 52 has been deployed to a target device, the next step is to just-in-time compile the engine portion of the installation file. The engine portion is transformed from intermediate language code to code that is executable on the target device. The target device executes the executable code to identify the target device as one of the plural target device types (step 64), to retrieve or extract the corresponding one of the plural data sets for the identified target device type (step 66), and to install the retrieved data set on the target device.

With reference to the flowchart of FIG. 5, the method steps located above line 25 are typically performed on a development platform 12, while the method steps located below line 25 are performed on one or more target devices, such as devices 30, 32, 34, 36, 38, and 40.

In one exemplary approach, diagrammed in FIG. 5, the source code for the base engine of the installation file is written in a .NET language, such as, for example, C# (Step 82). In another approach (not shown), the source code is written in Java or a similar suitable language. With the recent increase in languages that support just-in-time compilation, such as, for example, .NET and Java, an application or program no longer needs to be compiled for a specific type of processor. As a result, the same program in uncompiled format can be installed and run on many different types of devices.

With continued reference to FIG. 5, the source code of the base engine is compiled by a compiler (e.g., a .NET compiler) (Box 84) into an Intermediate Language Code ("IL code") (Step 86). IL code comprises a generic format that can later be compiled just-in-time at the target device. The IL code does not contain any processor specific instructions; rather, it has an .exe extension like any other executable.

When the IL code of the engine is executed on the development platform 12, the installation file is created (e.g., by concatenating the appropriate data sets to the IL engine). When the IL code is deployed to the target device and executed, the IL code triggers the just-in-time compiler (Box 88) to start up and compile the IL code into a machine-specific code that can then be executed by the target device. The machine-specific code typically does not generate a separate file; rather, in most cases the code is just-in-time compiled when a user wants to execute the program. As explained above, when the just-in-time compiled machine specific code is executed by the target at Step 90, the target device performs a number of functions, such as extracting the data set and installing the data set(s) appropriate for the target device.

With reference once again to FIG. 4, the executable portion of the installation file 52 preferably runs a check to make sure no critical errors were encountered while extracting the files. Once the installation file 52 verifies that there are no critical errors and installation is complete, the next step is to determine whether or not to execute an autorun application (Step 72). The decision of whether or not to autorun the application installed on the target device is typically determined by the user at Step 70, or by the default settings or user preferences of the target device. In one embodiment, the target device is configured to prompt the user to decide whether or not to run the recently installed software. From Step 72, the next step is to either autorun application (Step 74) or exit the application (Step 80).

While the exemplary process outlined in FIG. 4 has been illustrated and described with particularity, it should be understood that no limitation of the scope of the invention is intended thereby. In one approach to installing software on multiple target devices with a single installation file 52, one or more of the data sets within the installation file 52 are encrypted and/or compressed. In an alternative approach, the entire installation file, comprising both the engine and the gathered plural data/file sets, is encrypted and/or compressed. Encrypted files are particularly useful where the file content is sensitive. Here, a password would be required before the extraction process on the target device begins. Compressed files would help reduce the size of the installation file 52, which would in turn result in quicker transfer of the installation file to the target device(s).

In one variation to the data installation method described herein, the installation file 52 can be deleted from the target device when extraction of the data/file sets is completed. In yet another variation to the data installation method described herein, at least one of the specific files installed on the target device has a shortcut created to it after the data file(s) have been installed.

Having thus described a preferred embodiment of a system and method for installing software on multiple types of target devices with a single installation file, it should be apparent to those skilled in the art that certain advantages of the within system and method have been achieved. It should also be appreciated that various modifications, adaptations, and alternative embodiments thereof may be made within the scope and spirit of the present invention. For example, a software installation system wherein the installation file source code is compiled by a .Net compiler into an intermediate language code has been illustrated, but it should be apparent that the inventive concepts described above would be equally applicable to a system wherein the source code is compiled by a Java compiler. The invention is solely defined by the following claims.

What is claimed is:

1. A method of installing data onto a target device, comprising the steps of:
   providing an installation file, the installation file comprising an engine concatenated with plural data sets, the plural data sets corresponding respectively to plural target device types having different directory structures, the engine being in an intermediate language code;
   loading the installation file onto the target device;
   just-in-time compiling the engine into code executable on the target device type; and
   executing the compiled engine to identify the target device as one of the plural target device types, to retrieve the corresponding one of the plural data sets for the identified target device type, and to install the retrieved data set onto the target device.

2. The method of claim 1, wherein the step of providing the installation file comprises placing the installation file on a remote file system that is accessible to the plural target device types, wherein the installation file can be downloaded onto the target device types.

3. The method of claim 2, wherein the step of placing the installation file on a remote file system comprises uploading the installation file to an internal network system.

4. The method of claim 2, wherein the step of placing the installation file on a remote file system comprises uploading the installation file to an internet site.

5. The method of claim 1, wherein the step of providing the installation file comprises saving the installation file onto a storage medium and distributing the storage medium to users of the plural target device types.

6. The method of claim 5, wherein the storage medium comprises a compact disc.

7. A computer program product stored on a target device, comprising:
   an engine that is in an intermediate language format; and
   plural data sets corresponding respectively to plural target device types having different directory structures, the plural data sets being concatenated with the engine;
   wherein the engine comprises computer executable instructions to be just-in-time compiled into code executable on a the target device;
   wherein the target device executable code comprises instructions for:
   identifying the target device as one of the plural target device types;
   retrieving the corresponding one of the plural data sets for the identified target device type; and
   installing the retrieved plural data set onto the target device.

8. The product of claim 7, wherein the storage medium comprises a compact disc.

9. The product of claim 7, wherein:
   each data set is part of a data file; and
   the product comprises plural data files corresponding respectively to the plural target device types, the plural data sets being concatenated with the engine.

* * * * *